United States Patent [19]

Matsuyama et al.

[11] Patent Number: 5,389,189
[45] Date of Patent: Feb. 14, 1995

[54] SPLICING TAPE FEEDING DEVICE FOR USE IN A TAPE SPLICER

[75] Inventors: Masayoshi Matsuyama, Machida; Yoshihiko Miyasaka, Yokohama, both of Japan

[73] Assignee: Sony Magnescale Inc., Tokyo, Japan

[21] Appl. No.: 51,867

[22] Filed: Apr. 26, 1993

[30] Foreign Application Priority Data

Aug. 26, 1992 [JP] Japan .................. 4-227451

[51] Int. Cl.$^6$ .............................................. B65H 21/00
[52] U.S. Cl. ..................................... 156/506; 156/157; 156/304.3; 156/510; 226/134; 226/158; 83/203; 83/270; 83/276
[58] Field of Search .............. 156/304.1, 304.3, 157, 156/505, 506, 510; 226/134, 147, 158; 83/203, 235, 269, 270, 276

[56] References Cited

U.S. PATENT DOCUMENTS

| | | | |
|---|---|---|---|
| 2,552,148 | 5/1951 | Carson | 156/505 |
| 3,694,294 | 9/1972 | Cafiero | 156/505 X |
| 3,770,551 | 11/1973 | Ceroll | 156/506 |
| 4,462,858 | 7/1984 | Goguen et al. | 156/506 |
| 4,501,630 | 2/1985 | Kiuchi | 156/506 X |
| 4,636,279 | 1/1987 | Morgan | 156/506 |
| 4,747,554 | 5/1988 | Kubo | 242/56 |
| 5,164,031 | 11/1992 | Matsuyama et al. | 156/505 X |

Primary Examiner—Mark A. Osele
Attorney, Agent, or Firm—Foley & Lardner

[57] ABSTRACT

A splicing tape feeding device is disclosed which is adapted for supplying a splicing tape for joining a magnetic tape to a leader tape. The splicing tape feeding device includes a stationary base member and a movable member displaceable relative to the base member. The base member and the movable member have splicing tape transport paths with a lateral width not less than that of the splicing tape. Parallel flanges are formed on opposite sides of each of the tape transport paths and prevent a lateral displacement of the splicing tape. Engageable mating portions are formed on the base member and the movable member to eliminate a distance in the feeding direction of the splicing tape between the base member and the movable member.

5 Claims, 5 Drawing Sheets

SPLICING TAPE FEEDING DEVICE FOR USE IN A TAPE SPLICER

BACKGROUND OF THE INVENTION

The present invention relates to an automatic tape splicer for connecting two separate tapes by using a splicing tape, and more particularly to a device for feeding the splicing tape, which is used in the tape splicer.

Automatic tape splicers for joining two separate tapes are well known in the art. For instance, such automatic tape splicers are utilized for connecting a magnetic tape with a leader tape. Upon use of the tape splicers, an adhesive splicing tape is employed to be applied onto the adjacent ends of the tapes to be spliced. The adhesive splicing tape is supplied by using a splicing tape feeding device.

One example of the splicing tape feeding device is disclosed in U.S. Pat. No. 4,636,279 issued on Jan. 13, 1987. The splicing tape feeding device described therein includes a stationary block, an applicator arm and a movable block operatively connected with the applicator arm. The movable block is moved by one end of the applicator arm toward the stationary block while retaining a splicing tape thereon. The other end of the applicator arm urges the splicing tape against two adjacent ends of tape on a reaction bed.

However, in such the splicing tape feeding device, upon an advancing or retracting movement of the movable block relative to the stationary block, the splicing tape is likely to be slackened between the stationary block and the movable block. The slackened splicing tape disturbs the feeding of the splicing tape.

SUMMARY OF THE INVENTION

An object of the present invention is to provide a splicing tape feeding device capable of smoothly feeding a splicing tape to join two separate tapes.

According to the present invention, there is provided a splicing tape feeding device for supplying a splicing tape to join two separate tapes, comprising:
 a stationary base member having a flat surface;
 a movable member displaceable relative to the stationary base member and having a flat surface;
 means for defining a tape transport path supporting the splicing tape, on each of the flat surfaces of the stationary base member and the movable member, and preventing lateral displacement of the splicing tape relative to a feeding direction of the splicing tape, the defining and preventing means being disposed on opposite sides of the tape transport path;
 a cutting member movable in a lateral direction of the splicing tape to cut away a leading end of the splicing tape supplied through the tape transport paths;
 a movable applying member having a flat surface on which the cut away leading end of the splicing tape is retained, and applying same onto adjacent ends of the tapes to be spliced;
 a first mating portion formed on the stationary base member; and
 a second mating portion formed on the movable member;
 the first and second mating portions being engageable with each other to form a continuous plane of the tape transport paths;
 wherein the tape transport paths are kept flush with each other during the movement of the movable member and have a lateral width not less than that of the splicing tape, and the first and second mating portions cooperate with each other to eliminate a distance in the feeding direction of the splicing tape between adjacent distal ends of the stationary base member and the movable member.

DESCRIPTION OF THE PREFERRED EMBODIMENT

Figure 1:
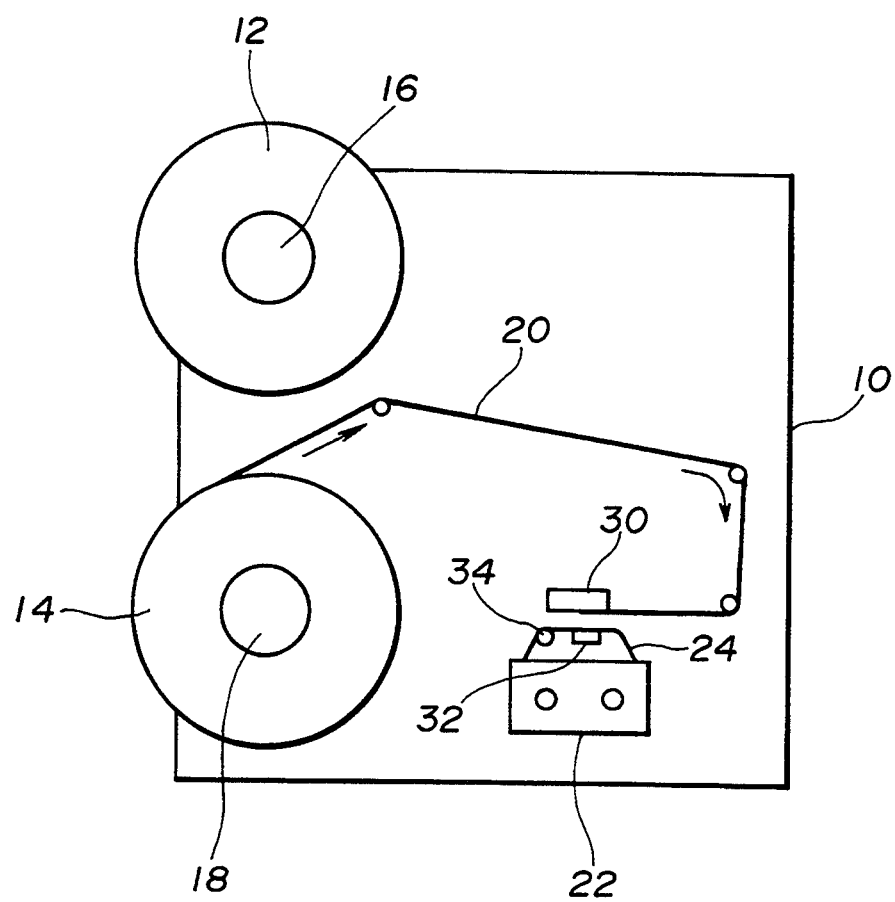
FIG. 1 is a schematic view of a tape winding apparatus for winding a magnetic tape, which includes a tape splicer.

Referring now to FIG. 1, there is shown a tape winding apparatus 10 including a tape splicer in which a splicing tape feeding device according to the present invention should be incorporated. As shown in FIG. 1, the tape winding apparatus 10 includes two reels 12 and 14 which are rotatably supported on reel hubs 16 and 18, respectively. A leading end of a magnetic tape 20 wound on the reel 14 is drawn therefrom to be transported to a base block 30 disposed in the tape splicer. The magnetic tape 20 may be also drawn out of the reel 12 about which the magnetic tape 20 is wound.

Disposed adjacent the base block 30 is a cartridge housing 22 as seen in FIG. 1. The cartridge housing 22 accommodates a leader tape 24 wound on reels (not shown) which are rotatably disposed in the cartridge housing 22. The leader tape 24 is wrapped about a movable block 32 and a movable tape drawing guide 34. By outward movements of the movable block 32 and the tape drawing guide 34, the leader tape 24 is drawn out through an opening (not shown) formed on the cartridge housing 22. The opening is always covered by a lid (not shown) mounted on the cartridge housing 22.

Figure 2:
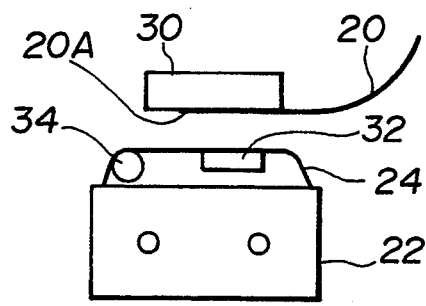
FIGS. 2 through 9 show operation of the tape splicer.
Figure 6:
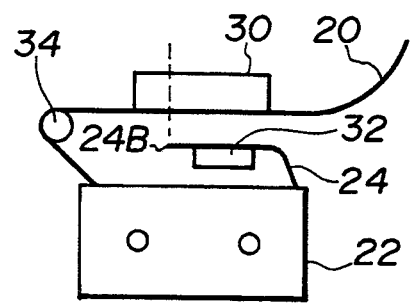

A splicing operation in the tape splicer will now be explained with reference to FIGS. 2 through 9. Referring to FIG. 2, the leading end 20A of the magnetic tape 20 is retained by suction on a surface of the base block 30 which has suction holes communicated with a vacuum source. On the other hand, the leader tape 24 is retained by suction on a surface of the movable block 32 which has suction holes communicated with a vacuum source (not shown).

Figure 3:
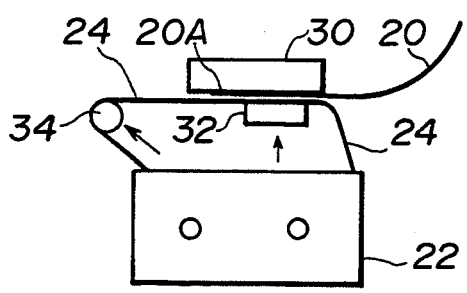

The leader tape 24 is further drawn out of the cartridge housing 22 by the outward movements of the movable block 32 and the tape drawing guide 34 as indicated by arrows in FIG. 3. Then, the movable block 32 is moved to abut against the base block 30 such that the leader tape 24 retained on the movable block 32 is overlapped on the leading end 20A of the magnetic tape 20 retained on the base block 30 as seen in FIG. 3.

Subsequently, the leader tape 24 is cut at a position corresponding to the leading end 20A of the magnetic tape 20 by a cutter (not shown) which is actuated by a drive source such as an air cylinder. The cutter is movable in a lateral or transverse direction relative to a feeding direction of the leader tape 24 so as to cut the leader tape 24.

Figure 4:
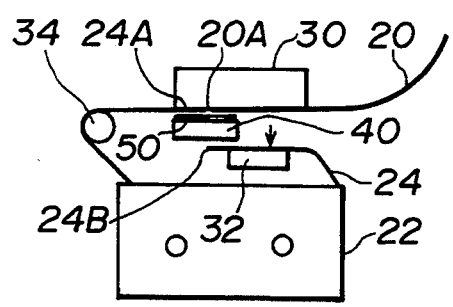

As shown in FIG. 4, one cut end 24A of the leader tape 24 is retained by suction adjacent the leading end 20A of the magnetic tape 20 on the base block 30. The other cut end 24B of the leader tape 24 is retained by suction on the movable block 32. Thereafter, the movable block 32 moves inwardly away from the base block 30 while retaining the other end 24B of the leader tape 24, as seen in FIG. 4.

Subsequently, an applying member 40 disposed in the splicing tape feeding device, is driven to advance toward the base block 30 so as to be opposed thereto. The applying member 40 retains a strip of a splicing tape 50 thereon by vacuum suction, as mentioned below. The strip of the splicing tape 50 is positioned opposed to the leading end 20A of the magnetic tape 20 and the one end 24A of the leader tape 24 on the base block 30. The strip 50 is pressed by an advancing motion of the applying member 40, against the base block 30 to be attached onto the adjacent ends 20A and 24A of the magnetic tape 20 and the leader tape 24. Thus, the leading end 20A of the magnetic tape 20 and the one end 24A of the leader tape 24 are joined together through the strip 50 of the splicing tape. Then, the applying member 40 retracts from the base block 30 and the magnetic tape 20 on the base block 30 is released from a suction force by the vacuum source.

Figure 5:
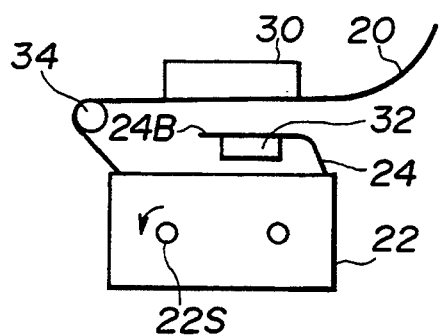
Figure 9:
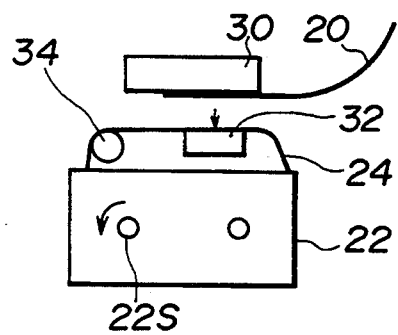

Simultaneously, a supply reel hub 22S disposed in the cartridge housing 22 is driven by a motor to rotate in a counterclockwise direction as indicated by an arrow in FIG. 5. The magnetic tape 20 is wound around the supply reel hub 22S.

When a predetermined length of the magnetic tape 20 is wound around the supply reel hub 22S, the rotation of the supply reel hub 22S stops. Then, the magnetic tape 20 is again subjected to sucking on the base block 30 and then cutting by the cutter at a given position as indicated in a chain line of FIG. 6, so as to produce a rear end 20B of the magnetic tape 20 to be accommodated in the cartridge housing 22.

Figure 7:
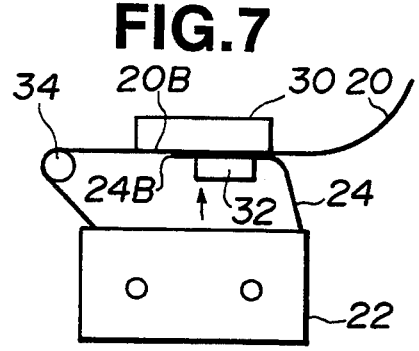

Subsequently, the movable block 32 retaining the other cut end 24B of the leader tape 24 is moved toward the base block 30 as indicated by an arrow in FIG. 7. Then, the end 24B of the leader tape 24 is aligned, in an overlapped relation, with the next leading end of the magnetic tape 20 retained on the base block 30. The rear end 20B of the magnetic tape 20 is substantially opposed to the end 24B of the leader tape 24 retained on the movable block 32.

Figure 8:
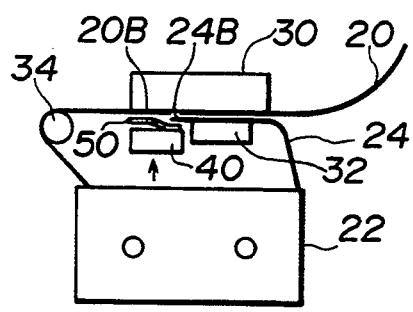

Subsequently, the applying member 40 is moved toward the base block 30 as indicated by an arrow in FIG. 8, while suctionally retaining a strip of the splicing tape 50. The applying member 40 further advances to press the strip of the splicing tape 50 against the rear end 20B of tile magnetic tape 20 and the end 24B of the leader tape 24 which are opposed on the base block 30. Thus, the two opposed ends 20B and 24B are joined together through the strip of the splicing tape 50. Accordingly, the predetermined length of the magnetic tape 20 is allowed to be spliced at the ends 20A and 20B with respective lengths of the leader tape 24.

Following the completion of the splicing operation, the applying member 40 retreats from the base block 30. The tape drawing guide 34 and the movable block 32 are moved toward the cartridge housing 22 as indicated by arrows in FIG. 9, so as to return back to their initial positions as shown in FIG. 2. Then, the supply reel hub 22S rotates counterclockwise as indicated by an arrow in FIG. 9 so that the magnetic tape 20 spliced with the leader tape 24 is wound thereon to be accommodated within the cartridge housing 22.

Figure 10:
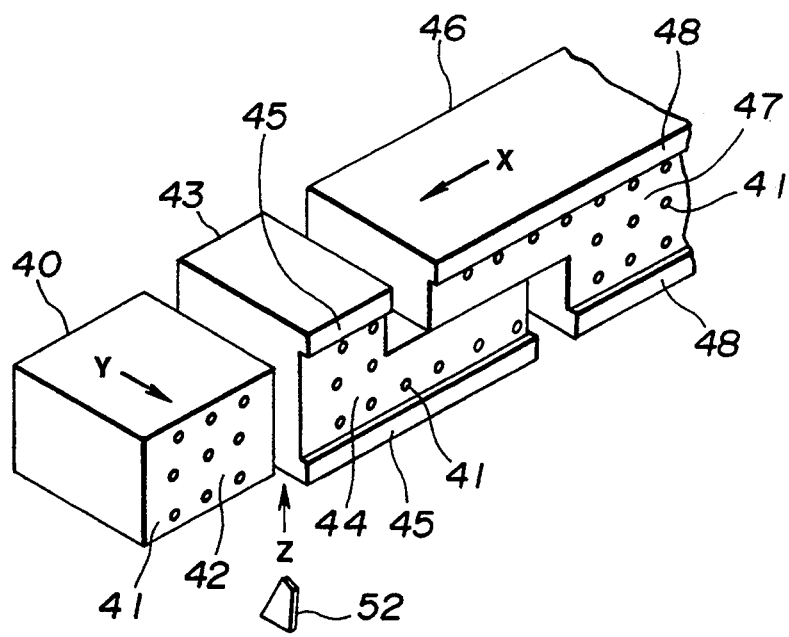
FIGS. 10 and 11 are perspective views of a first embodiment of a splicing tape feeding device according to the present invention, which are in different operational positions.
Figure 11:
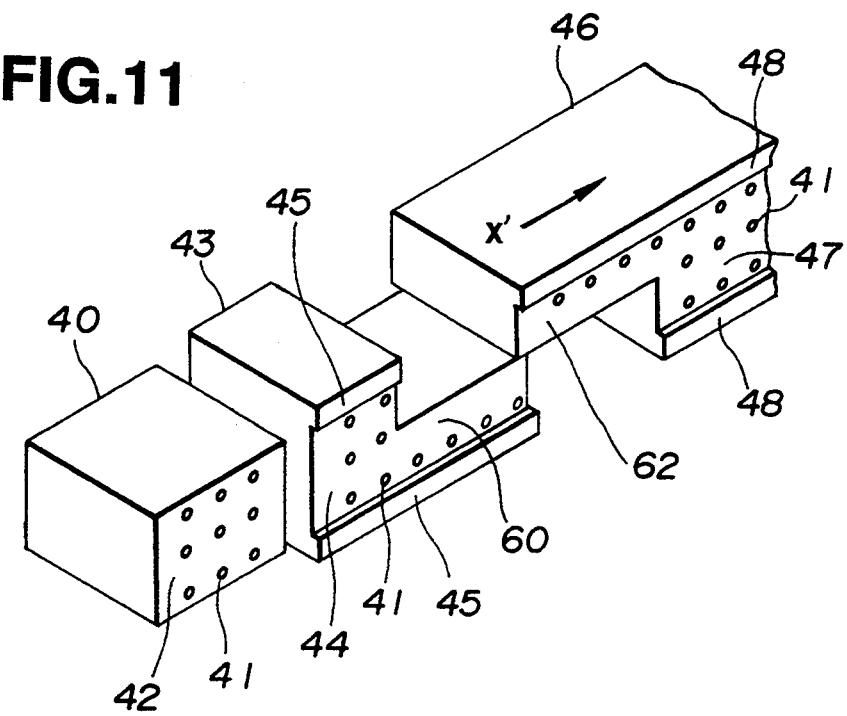

Referring now to FIGS. 10 and 11, there is shown a detail of the splicing tape feeding device. The splicing tape feeding device includes the applying member 40 as briefly described above, a stationary base member 43, a movable member 46 displaceable relative to the stationary base member 42, and a cutter 52. The stationary base member 43 includes a box-like body portion having a flat surface on which upright flanges 45, 45 are formed to extend parallel to each other. The movable member 46 disposed adjacent the stationary base member 43, includes a box-like body portion having a flat surface on which upright flanges 48, 48 are formed to extend parallel to each other. The upright flanges 45 and 48 define tape transport paths 44 and 47 on the respective flat surfaces of the stationary base member 43 and the movable member 46. Through the tape transport paths 44 and 47, the splicing tape 50 is fed from a source of supply (not shown) thereof to the applying member 40. As seen in FIGS. 10 and 11, the upright flanges 45 and 48 are disposed on opposite sides of the tape transport paths 44 and 47. The provision of the parallel flanges 45 and 48 serves for preventing a lateral displacement of the splicing tape 50 relative to the feeding direction of the splicing tape 50 during transportation of the splicing tape 50. Formed on the flat surfaces with the tape transport paths 44 and 47 are a plurality of suction holes 41 which are communicated with a vacuum source (not shown) such as a vacuum pump. Thus, the splicing tape 50 can be retained by suction on the tape transport paths 44 and 47.

As seen in FIGS. 10 and 11, the applying member 40 is disposed adjacent the stationary base member 43 in a spaced relation. The applying member 40 includes a box-like body portion having a flat surface 42 on which suction holes 41 are formed. The suction holes 41 are communicated with a vacuum source(not shown) as well as the suction holes 41 on the stationary base member 43 and the movable member 46. The splicing tape 50 fed onto the flat surface 42 is retained by vacuum suction thereon. It is preferable that the flat surface 42 be flush with the tape transport paths 44 and 47.

As best shown in FIG. 11, the stationary base member 43 has a first mating portion 60 projecting outwardly from the body portion toward the movable member 46. The movable member 46 also has a second mating portion 62 projecting outwardly from the body portion toward the stationary base member 43. The first and second mating portions 60 and 62 are engageable with each other to form a continuous plane of the tape transport paths 44 and 47. In addition, the first and second mating portions 60 and 62 cooperate with each other to eliminate a distance in the feeding of the splicing tape 50 between adjacent distal ends of the stationary base member 43 and the movable member 46. The tape transport paths 44 and 47 are kept flush with each other during the movement of the movable member 46 and have a lateral width not less than that of the splicing tape 50.

The movable member 46 advances toward the stationary base member 43 in a direction as indicated by an arrow X in FIG. 10, which is parallel to the feeding direction of the splicing tape 50. During the advancing movement, the splicing tape 50 on the movable member 46 is retained by suction thereon and transported in the direction X. Whereas, when the movable member 46 moves away from the stationary base member 43 in the reverse direction as indicated by an arrow X' in FIG. 11, the splicing tape 50 is released From suction on the movable member 46. The applying member 40 is movable in a direction as indicated by an arrow Y in FIG. 10 and a reverse direction thereto, which are perpendicular to the movement directions X and X' of the movable member 46. During the movement in the direction Y, the applying member 40 retains by suction tile splicing tape 50 to be applied. The cutter 52 is driven by an actuator (not shown) such as an air cylinder to be movable in a space between the applying member 40 and the stationary base member 43 in a direction as indicated by an arrow Z in FIG. 10, perpendicular to both the directions X and Y. Upon the movement in the direction Z, the cutter 52 severs the splicing tape 50 received on the applying member 40. Thus, a strip of the splicing tape 50 is cut out and subject to pressing by the applying member 40 against the adjacent ends of the magnetic tape and the leader tape to be spliced, as discussed above.

The feeding operation of the splicing tape feeding device will be explained hereinafter with reference to FIGS. 12 through 16.

Figure 12:
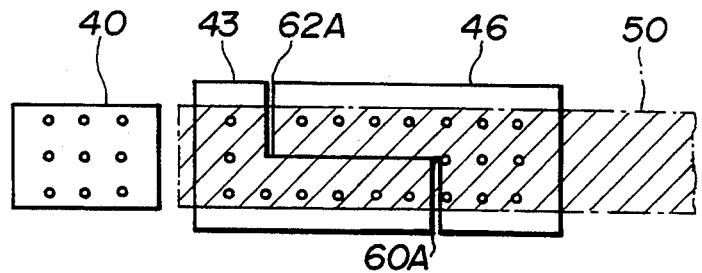
FIGS. 12 through 16 show the feeding operation of the splicing tape feeding device.

When the movable member 46 is in its initial position as seen in FIG. 12, the movable member 46 abuts against the stationary base member 43. The tape transport paths 44 and 47 are connected to each other to form a substantially continuous plane by the sufficient engagement of the first and second mating portions 60 and 62. Therefore, there is no gap between the stationary base member 43 and the movable member 46. In this condition, the splicing tape 50 is retained by suction on the stationary base member 43 and the movable member 46.

Figure 13:
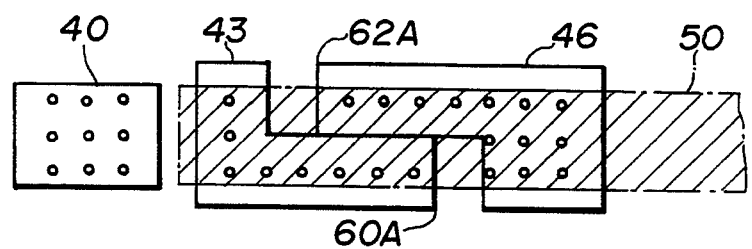
Figure 14:
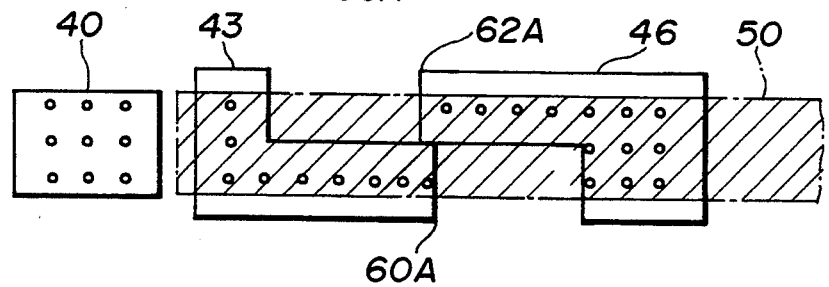
Figure 15:
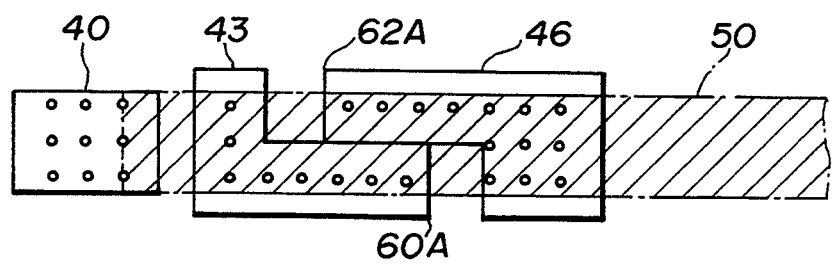

When the movable member 46 moves away from the stationary base member 43, the movable member 46 is displaced via its midway position to its remotest retracting position, as seen in FIGS. 13 and 14. During the retracting movement of the movable member 46, the vacuum suction is not applied to the splicing tape 50 on the movable member 46. In this position of FIG. 14, the stroke of the movable member 46 is maximum. Although a gap between opposed faces of the stationary base member 43 and the movable member 46 occurs, there is no distance in the splicing tape feeding direction between adjacent distal ends 60A and 62A of the stationary base member 43 and the movable member 46 as shown in FIG. 14. Thus, the first and second portions 60 and 62 with the distal ends 60A and 62A cooperate to eliminate the distance and therefore serve for preventing occurrence of slackening of the splicing tape 50 between the stationary base member 43 and the movable member 46.

Figure 16:
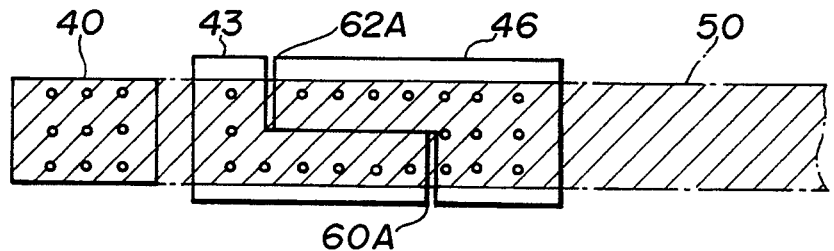

Subsequently, the movable member 46 starts its advancing movement toward the stationary base member 43 whereupon the vacuum suction is again applied to the splicing tape 50 on the movable member 46. The movable member 46 is displaced from the remotest position via its midway position to its closest advancing position, which are in turn shown in FIGS. 14, 15 and 16. During the advancing movement of the movable member 46, the gap between the opposed faces of the stationary base member 43 and the movable member 46 is reduced. In the closest advancing position (the initial position) of the movable member 46 as seen in FIG. 16, the first and second mating portions 60 and 62 are again sufficiently engaged with each other so that there is no gap between the stationary base member 43 and the movable member 46. During this advancing movement of the movable member 46, the splicing tape 50 is released from suction on the stationary base member 43 but suctioned on the movable member 46. To this end, a leading end of the splicing tape 50 is transported through the tape transport paths on the stationary base member 43 and the movable member 46 to be received over the whole area of the flat surface 42 of the applying member 40. Thus, the length of the splicing tape 50 received on the applying member 40 is equal to a distance of the maximum stroke of the movable member 46. As illustrated, the stationary member 43 has an end portion flat surface which is adjacent the movable applying member 40 and which retains the leading edge of splicing tape 50 over the whole width of the splicing tape.

Subsequent to the feeding operation, the leading end of the splicing tape 50 is subject to cutting and then applying operations as discussed above.

It is not necessary that the first and second mating portions are formed through a whole thickness of the stationary and movable members but it is sufficient that these mating portions are formed only with a shallow depth adjacent the flat surfaces of the stationary and movable members.

Figure 17:
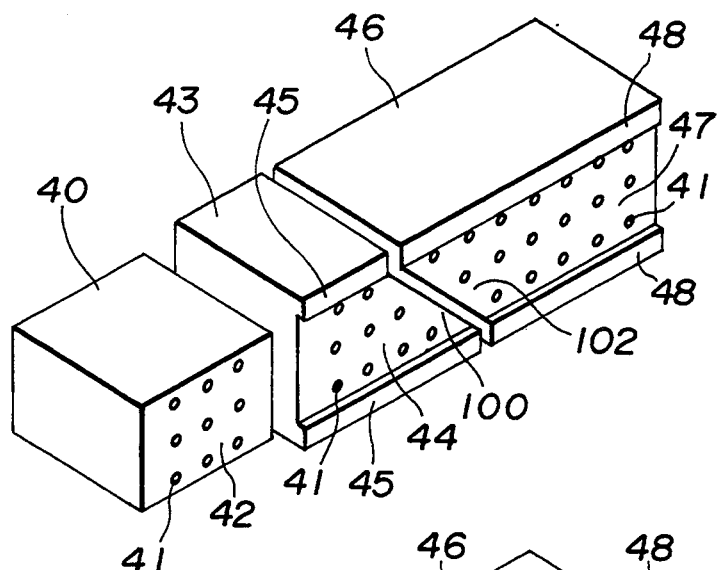
FIGS. 17 through 19 are perspective views of other embodiments of the splicing tape feeding device according to tile present invention.
Figure 18:
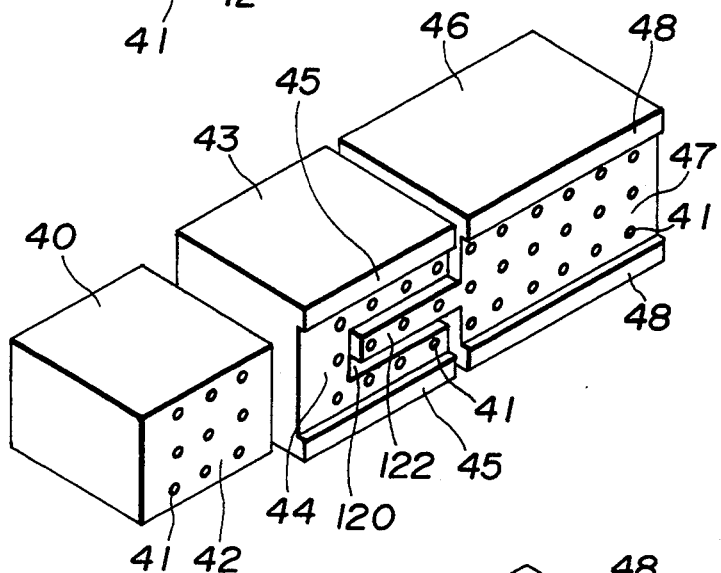
Figure 19:
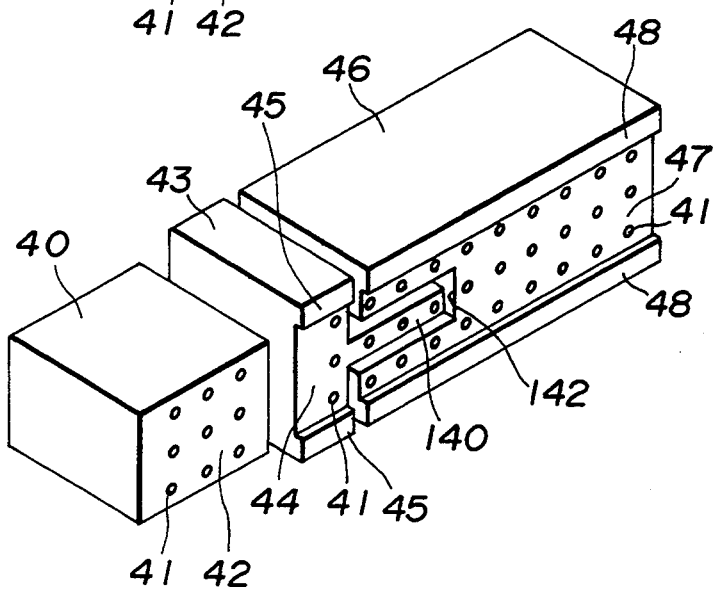

Referring to FIGS. 17 to 19, there are shown another embodiments of the first and second mating portions formed on the stationary base member and the movable member, according to the present invention. These embodiments are substantially the same as the first embodiment except for configuration of the first and second mating portions. In the drawings, like numerals indicate like parts of the stationary base member and the movable member as described above. As shown in FIG. 17, first and second mating portions 100 and 102 are tapered to have slant faces. As shown in FIGS. 18, a first mating portion 120 is formed into a channel shape and a second mating portion 122 is in the form of a protrusion engageable with the channel-shaped first mating portion. Alternatively, as seen in FIG. 19, a first mating portion 140 is in the form of a protrusion and a second mating portion 142 is of a channel shape engageable with the protrusion.

What is claimed is:

1. A splicing tape feeding device for supplying a splicing tape to join two separate tapes, said splicing tape having a uniform width in a lateral direction with respect to the feeding direction of the splicing tape, comprising:

a stationary base member having a flat surface;
a movable member displaceable relative to said stationary base member and having a flat surface;
means for defining a tape transport path supporting the splicing tape, on each of the flat surfaces of said stationary base member and said movable member, and for preventing lateral displacement of the splicing tape relative to a feeding direction of the splicing tape, said defining and preventing means being disposed on opposite sides of said tape transport path;
a cutting member movable in a lateral direction of the splicing tape to cut away a leading end of the splicing tape supplied through said tape transport paths;
a movable applying member having a flat surface on which the cut away leading end of the splicing tape is retained, said movable applying member applying the cut away splicing tape onto adjacent ends of the two separate tapes to be spliced;

said stationary member having a distal end portion flat surface which is disposed adjacent said movable applying member and retains the leading end of the splicing tape over the whole width of the splicing tape;

a first mating portion formed on said stationary base member; and a second mating portion formed on said movable member;

said first and second mating portions being engageable with each other to form a continuous plane of said tape transport paths;

wherein said tape transport paths are kept flush with each other during the movement of said movable member and have a lateral width in a lateral direction with respect to the feeding direction of the splicing tape, not less than the width of the splicing tape, and said first and second mating portions cooperate with each other to eliminate a distance in the feeding direction of the splicing tape between adjacent distal ends of said stationary base member and said movable member.

2. A splicing tape feeding device as claimed in claim 1, wherein said defining and preventing means include a pair of flanges extending uprightly on opposite sides of said tape transport path.

3. A splicing tape feeding device as claimed in claim 1, wherein the respective flat surfaces of said stationary base member, said movable member and said applying member are formed with a plurality of suction holes.

4. A splicing tape feeding device as claimed in claim 1, wherein the distance between the oppositely disposed defining and preventing means of the stationary base member is equal to the distance between the oppositely disposed defining and preventing means of the movable member.

5. A splicing tape feeding device as claimed in claim 2, wherein the distance between the pair of flanges of the stationary base member is equal to the distance between the pair of flanges of the movable member.

* * * * *